Nov. 27, 1928.
J. I. HULL
1,693,296
SPEED CONTROL AND FREQUENCY CONVERTER SET
Filed Dec. 6, 1924
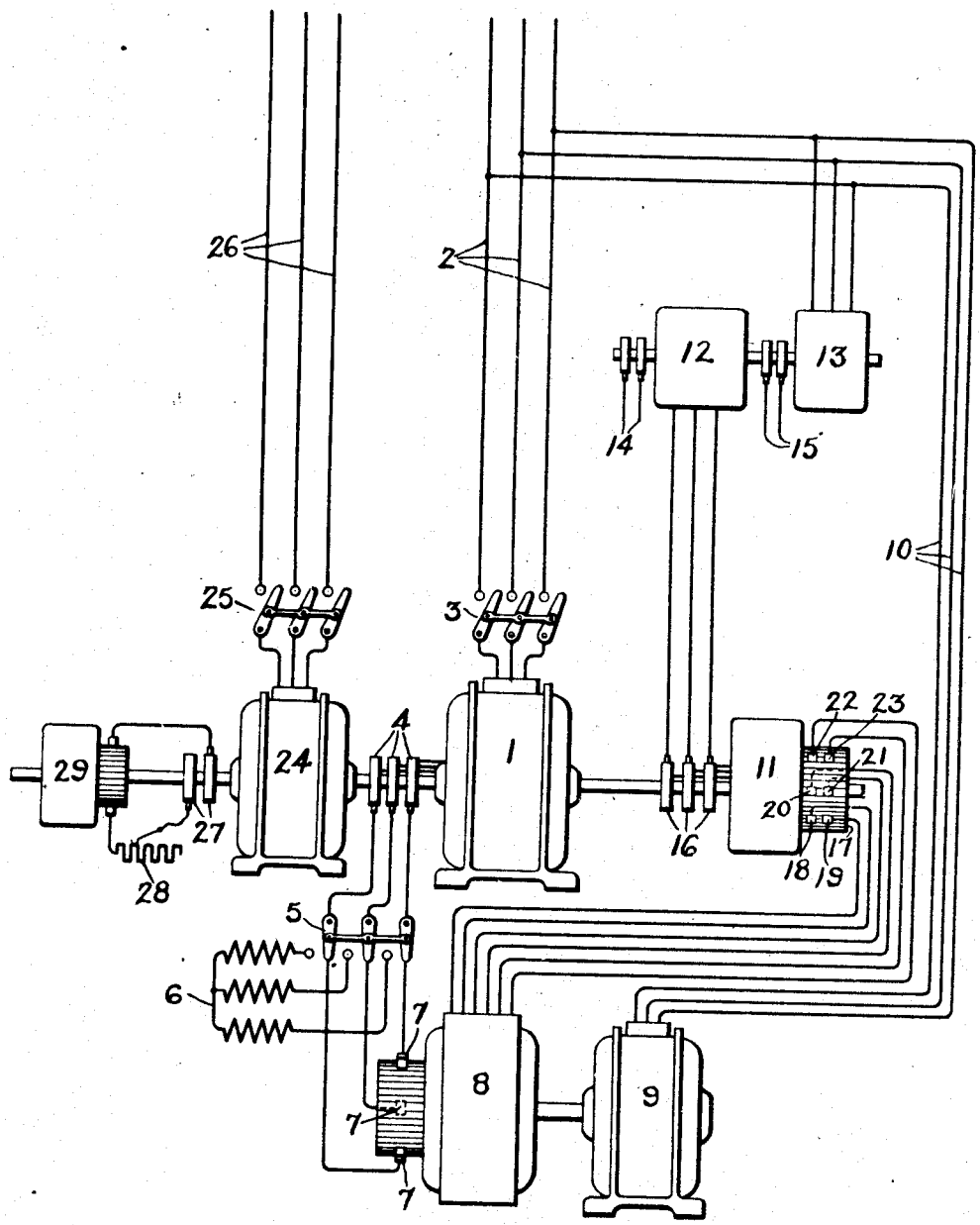
Inventor:
John I. Hull;
by *Alexander S. [signature]*
His Attorney.

Patented Nov. 27, 1928.

1,693,296

UNITED STATES PATENT OFFICE.

JOHN I. HULL, OF SCHENECTADY, NEW YORK, ASSIGNOR TO GENERAL ELECTRIC COMPANY, A CORPORATION OF NEW YORK.

SPEED-CONTROL AND FREQUENCY-CONVERTER SET.

Application filed December 6, 1924. Serial No. 754,405.

My invention relates to speed control and frequency converter sets wherein an exciter machine having a commutator is connected in cascade with an induction machine for the purpose of controlling its speed, and has for its object the provision of means for precluding self-excitation in sets of this character.

It is well known that the speed of an induction machine concatenated with a suitable regulating machine may be varied in either direction through synchronism by variation in the voltage of the regulating machine, and that the induction machine will function either as a generator or as a motor, when it is operated at speeds above or below synchronism. Such a control set or machine aggregate is described in United States Letters Patent of Arthur Scherbius, No. 1,059,771, April 22, 1923, and in my United States Letters Patent No. 1,306,594, June 10, 1919, which relates to improvements on the arrangement set forth by the aforesaid Patent No. 1,059,771. The speed control sets or machine aggregates shown by these patents are commonly known as Scherbius speed control sets and will be so designated hereinafter.

In the operation of a Scherbius speed control set, self excitation of the set can sometimes occur for the reason that the same power line or system is connected to the main induction machine and to the frequency changer through which the field current of the concatenated regulating machine is transmitted. Under these conditions changes in the electrical conditions of the induction machine produced by variation in the regulating machine voltage are apt to be reflected into the field circuit of the regulating machine, thus with suitable phase relations, tending to produce unstable operation or a cumulative effect and to superimpose on the power line or system currents of a frequency sometimes differing from that at which it is normally operated. This difficulty is of course most likely to be encountered when the generator capacity or the capacity of other apparatus connected to the power line is small as compared to that of the Scherbius set and when the Scherbius set is arranged in a well known manner to operate with a high or leading power factor.

In the illustrated modification of my invention, this difficulty is avoided by interposing a synchronous motor-generator set between the power line and the field circuit of the concatenated exciter.

My invention will be better understood from the following description when considered in connection with the accompanying drawing and its scope will be pointed out in the appended claims.

The drawing shows an induction machine 1 arranged to have its stator winding connected to a power line through a switch 3 and to have its rotor winding connected through slip rings 4 and switch 5 either to a starting resistor 6 or to the commutator brushes 7 of a regulating machine 8. The concatenated machine 8 is shown as mechanically coupled to a driving machine 9, which has its stator circuit interconnected with the line 2 through leads 10, and is arranged to have its completely separately excited field windings interconnected with the line 2 through a frequency changer 11 coupled to the machine 1 and a synchronous motor-generator set comprising machines 12 and 13. The machines 12 and 13 may have the same number of poles and may be supplied with direct current excitation through lines 14 and 15 respectively. The frequency changer 11 comprises an armature winding connected at one end to the slip rings 16 and at the other end to a commutator 17 which is arranged to cooperate with brush pairs 18 and 19, 20 and 21, and 22 and 23. The brushes of each pair are connected to opposite ends of a different phase of the regulating machine field winding and the corresponding brushes of the different pairs are arranged to be simultaneously moved about the commutator 17 for the purpose of varying the field current and voltage of the regulating machine 8. This movement of the brushes may be accomplished by means of relatively movable brush yokes, one of which is arranged to support and move the brushes 18, 20 and 22 and the other of which is arranged to support and move the brushes 19, 21 and 23, as set forth in United States reissue Letters Patent of Hidee Klaas Schrage, No. 14,031, December 14, 1915.

The apparatus illustrated by the drawing, in so far as it is described above, is adapted to control the speed of a load device coupled to the shaft of the induction machine 1. Since load devices of different kinds may be coupled to the shaft of the machine 1, my invention is obviously not limited to the use of the speed control set just described in connection with any special form of load device. For the purpose of explaining my invention, I have shown it as utilized in a frequency converter set similar to that described and claimed in an application for United States Letters Patent of Carl M. Gilt, Serial No. 638,756, filed May 14, 1923, and assigned to the same assignee as the present application. This frequency converter set comprises a machine 24 coupled to the shaft of the induction machine 1 and arranged to be connected through a switch 25 with a power line or system which may be operated at a frequency different from that at which the power line 2 is operated. The machine 24 may be either of the synchronous or induction type. It is illustrated as a synchronous machine arranged to have its field current supplied through slip rings 27 and an adjustable resistor 28 from an exciter 29 which may be mounted on the same shaft as the machines 1, 11 and 24.

It is well known that the frequency of the usual alternating current system is apt to vary slightly from its normal value due to variations in the system load. When two such systems are interconnected through a frequency converter set of the type illustrated, power is transmitted through the converter set in one direction when the frequency of one of the systems is relatively high and through this set in the opposite direction when the frequency of the other set is relatively high. The amount of power transmitted through the converter set thus varies with the relation existing between the frequencies of the two interconnected systems and, since these frequencies may vary over a range sufficiently large to overload the converter set, it is desirable to provide means for limiting the converter load to a safe value. This result may be accomplished through adjustment of the brush pairs 18—19, 20—21 and 22—23 in a manner to vary the field current of the regulating machine 8. As shown in the drawing, the pairs of brushes are in each case located so that the two brushes of each pair coincide in position on one commutator bar. Under these conditions, no current is supplied from the frequency changer to the field winding of the regulating machine 8. The brush arrangement is such that the brushes 18, 20 and 22 may be simultaneously moved in one direction by any suitable means while the brushes 19, 21 and 23 are likewise moved in the opposite direction and vice versa. When the brushes 18, 20 and 22 are moved in one direction from their illustrated position, therefore, the voltage of the regulating machine 8 is increased in one direction and when this group of brushes is moved in the opposite direction from this position, the voltage of the regulating machine 8 is increased in the opposite direction.

As set forth in the aforesaid Scherbius patent, the voltage of the regulating machine may be utilized to determine the speed of the induction machine both when it operates as a motor and when it operates as a generator. In the case of the converter set illustrated, machine 24 of course always runs at a speed corresponding to the frequency of line 26. It is therefore necessary only to displace the brushes of the frequency changer machine 11 until the main induction motor 1 operates on the existing frequency of line 2 and with the desired motor or generator load at exactly the speed demanded by machine 24.

As previously indicated, my invention relates particularly to means for avoiding self-excitation of the machine aggregate and differs from that set forth in the aforesaid Gilt application in that the frequency changer exciter is connected to the power line through self-excitation avoiding means, illustrated as a synchronous motor-generator set, instead of through a transformer. With this arrangement, the excitation of the concatenated regulating machine is determined by the line frequency and the brush setting, and variation in the voltage or current of the power line produced by changes in the operation of the induction machine or the converter set are rendered incapable of affecting the excitation of the concatenated exciter machine in a manner to produce self-excitation of the set. The synchronous motor-generator set thus forms a tie between the power line and the frequency changer exciter by means of which current of the proper frequency is transmitted through the field winding of the concatenated regulating machine without danger of producing self-excitation of the complete set.

I have explained my invention by illustrating and describing a certain specific embodiment thereof, but it will be readily understood by those skilled in the art that the arrangement of this embodiment may be modified in certain of its details. I, accordingly, do not wish to be restricted to the particular arrangement disclosed herein by way of example for the purpose of setting forth my invention in accordance with the patent statutes. The terms of the appended claims are, therefore, not restricted to the precise arrangement disclosed, but are intended to cover all changes and modifications within the true spirit and scope of my invention.

What I claim as new and desire to secure by Letters Patent of the United States, is:

1. In combination, a power line, an induction machine connected to said power line, a regulating machine concatenated with said induction machine, a completely separately excited field winding on said regulating machine, and means for supplying excitation energy from said power line to said field winding comprising apparatus which is responsive to the frequency changes of said line, but nonresponsive to other electrical changes of said line which are apt to produce self-excitation of said concatenated combination.

2. In combination, a power line, an induction machine having its primary connected to said line, a regulating machine concatenated with the secondary of said induction machine, a completely separately excited field winding on said regulating machine, and means for supplying excitation energy from said power line to said field winding comprising a frequency changer and a synchronous motor generator set, said means being arranged to be responsive to the frequency changes of said line, but nonresponsive to the voltage changes thereof.

In witness whereof, I have hereunto set my hand this 5th day of December, 1924.

JOHN I. HULL.